Sept. 22, 1931. C. B. BAILEY 1,824,386
GASKET
Filed June 8, 1925
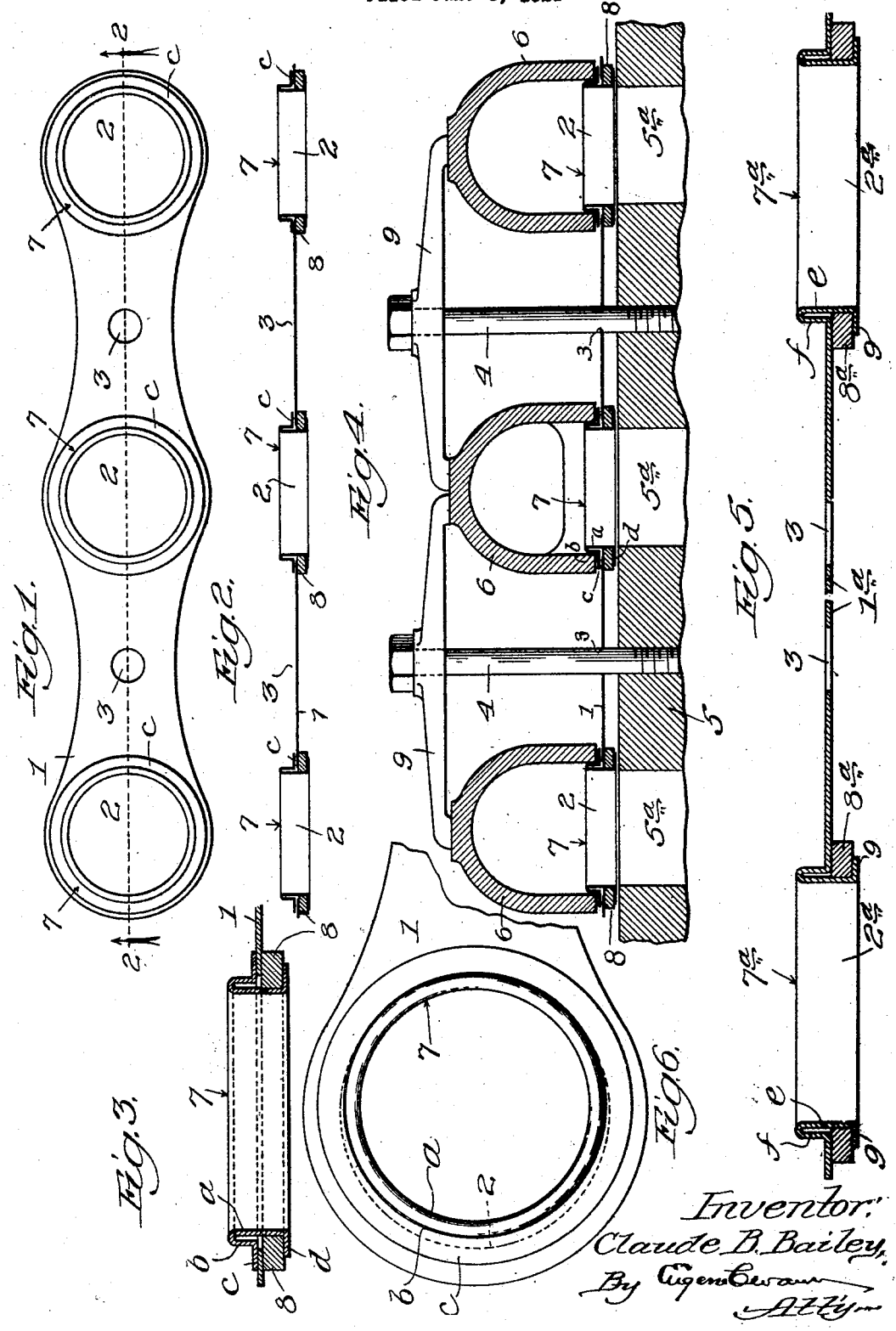
Inventor:
Claude B. Bailey,
By Eugene Ewan
Atty Patented Sept. 22, 1931

1,824,386

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed June 8, 1925. Serial No. 35,511.

This invention has particular reference to manifold gaskets such as are in elongated strip form and have a plurality of port holes spaced apart lengthwise of the gasket so that single gaskets may accommodate a plurality of spaced port openings in the cylinder block and associated manifolds.

The main object of my invention is to make the body portion of the gasket entirely of sheet metal as a single layer and to have the sheet metal tubular guides support asbestos rings about the port holes to provide the cushions required, thereby reducing the cost of the gasket structure by eliminating the use of asbestos layers extending over the entire area of the gaskets or being coextensive therewith, as heretofore employed in gaskets of this kind.

The invention consists further in the matters hereinafter described and claimed.

In the accompanying drawings—

Fig. 1 is a top plan view of a manifold gasket constructed in accordance with my invention;

Fig. 2 is a longitudinal sectional view through the gasket on line 2—2 of Fig. 1;

Fig. 3 is an enlarged vertical sectional view through one of the port holes of the gasket to more clearly illustrate the combined pressure receiving portion and tubular guide;

Fig. 4 is a sectional view showing the gasket clamped in place between the cylinder block and an associated manifold;

Fig. 5 is a vertical sectional view showing the pressure receiving portions and guides integral with the sheet metal body of the gasket, and Fig. 6 is a plan view of Fig. 3 showing the adjustable feature of the guide.

The manifold gasket of my invention has a relatively narrow and elongated body portion 1 made from a single layer or piece of sheet metal, such as copper, brass, aluminum, zinc, or other suitable material. The gasket has a plurality of port holes 2, 2 spaced apart lengthwise thereof, as shown in Figs. 1 and 2. The gasket body is provided, between the holes 2, with smaller openings 3, 3 to receive the studs for bolts 4, 4 for holding the gasket in position between the cylinder block 5 and the associated manifold pipes 6, 6, as shown in Fig. 4.

The gasket is provided with a plurality of combined pressure receiving portions and tubular guides 7, 7 carried by the gasket body 1 at each of the port holes 2, 2 and completely surrounding the same. These portions, as shown in Figs. 1 to 4, are formed independently of the sheet steel gasket body 1 and are carried thereby about the holes 2, 2. The tubular guide portion of each member 7 is formed from a single piece of sheet metal in annular form and folded on itself to provide inner and outer flanges $a$, $b$ connected at their outer ends by the folded edge of the metal, as clearly shown in Fig. 3. These flanges $a$, $b$ project from the gasket body 1 to one side thereof with the inner flanges $a$ extending through the body 1 to the opposite side thereof through the associated holes 2, 2, as shown. The outer flange $b$ extends to the body 1 on the side on which it is located and has a marginal flange $c$ seating or engaging against the sheet metal body 1, as shown. The inner flange $a$ continues beyond the body 1 and has its free margin turned laterally to provide a flange $d$ between which and the body 1 there is provided an annular space to receive a ring 8 of asbestos or like material. The flange $d$ holds the ring 8 in place and against the surface of the body 1 opposite the flange $c$.

The rings 8 and associated flanges $c$, $d$ together with the interposed body layer 1 increase the thickness of the gasket at the port holes 2, 2 and not elsewhere. This provides the cushion required immediately about the port holes, and allows the pressure exerted on the gasket when clamping it in place to be concentrated on and confined to these portions to provide tight joints with less pressure than heretofore required. Moreover, this is accomplished by having the asbestos members relatively narrow and in ring form instead of applying this material in flat layers co-extensive with the area of the entire gasket, as heretofore. This results in saving material and cost of gasket manufacture.

In Fig. 5, I have shown the guide portions 7ª made integral with the sheet metal of the body 1ª so as to further cheapen the cost of manufacture and make a more durable structure. In this form the metal at the edges of the port holes 2ª is flanged up from the plane of the body and folded on itself to provide the inner and outer flanges e, f, as shown. The outer flange f is wholly on one side of the body and is integrally connected with the body. The inner flange e extends through the body, as shown, and has its free margin turned laterally outward to provide a flange g to hold an asbestos ring 8ª in place, in the same manner and for the same purpose as heretofore described.

The gaskets of my invention have body portions made entirely of sheet metal, thereby eliminating the use of the coextensive asbestos layers in the body structure, as heretofore. This is an important factor of my invention, because it simplifies the structure and lessens the cost of manufacture. With the large asbestos layers eliminated there are no parts to readily fracture in handling the gaskets and produce blowouts when the gaskets are put to use, as heretofore.

The particular gasket shown is especially designed for use with Ford manifolds. A single gasket accommodates three port holes 5ª, 5ª in the cylinder block 5 and their associated manifold pipes 6, 6. The studs 4 hold the gasket in place on the block at the port holes, and the tubular guides of the gasket guides the manifold pipes 6 in register with the port holes of the block by the guides entering the manifold pipes, as shown. The usual manifold clamps 9 engage the studs and are clamped against the manifold by nuts on the studs as usual in equipment of this kind.

When the guide members 7, 7 are made separate from the sheet metal body 1, said members may be adjusted in the plane of the body within the confines of their respective port holes 2 by making the latter large enough for this purpose. This allows for adjustment of the guides to meet the spacing of the manifold pipes. Fig. 3 shows the guide adjusted within the port hole or opening 2.

I claim as my invention:

1. A manifold gasket having an elongated body composed of a single layer of sheet metal and having a plurality of port and stud holes therein spaced apart lengthwise of the gasket body with the stud holes between the port holes, asbestos rings, one about each port hole on the under side of the body, and tubular guide members at the respective port holes and projecting outward from the upper side of the body, each of said guide members being made in folded form from a single integral piece of sheet metal separate from the body and having inner and outer annular portions integrally connected together by the fold in the metal between them at the outer end of said member, said portions having base flanges engaging the outer sides of the gasket body and rings, respectively, for holding the guides on the body and the rings against the same; the inner portions of the guides extending through the associated rings and port holes.

2. A manifold gasket having an elongated body composed of a single layer of sheet metal and having a plurality of port and stud holes therein spaced apart lengthwise of the gasket body with the stud holes between the port holes, asbestos rings, one about each port hole on the under side of the body, and tubular guide members at the respective port holes and projecting outward from the upper side of the body, each of said guide members being made in folded form from a single integral piece of sheet metal separate from the body and having inner and outer annular portions integrally connected by the fold in the metal between them at the outer end of the member, said portions having base flanges engaging the gasket body and rings, respectively, for holding the guides on the body and the rings against the same; the inner portions of the guides extending through the associated port holes and having diameters much less than the same so that the guides may be adjusted in the port holes in the plane thereof.

In testimony whereof I affix my signature this 3rd day of June, 1925.

CLAUDE B. BAILEY.